(12) United States Patent
Gresset

(10) Patent No.: US 11,303,908 B2
(45) Date of Patent: Apr. 12, 2022

(54) METHOD AND SERVER FOR CONTROLLING VIDEO ENCODER

(71) Applicant: MITSUBISHI ELECTRIC CORPORATION, Tokyo (JP)

(72) Inventor: Nicolas Gresset, Rennes (FR)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/755,834

(22) PCT Filed: Sep. 13, 2018

(86) PCT No.: PCT/JP2018/034942
§ 371 (c)(1),
(2) Date: Apr. 13, 2020

(87) PCT Pub. No.: WO2019/106919
PCT Pub. Date: Jun. 6, 2019

(65) Prior Publication Data
US 2020/0275108 A1    Aug. 27, 2020

(30) Foreign Application Priority Data
Nov. 29, 2017   (EP) ..................................... 17204415

(51) Int. Cl.
*H04N 19/164* (2014.01)
*H04N 19/115* (2014.01)
(Continued)

(52) U.S. Cl.
CPC ......... *H04N 19/164* (2014.11); *H04N 19/115* (2014.11); *H04N 19/179* (2014.11); *H04W 4/021* (2013.01); *H04W 72/082* (2013.01)

(58) Field of Classification Search
None
See application file for complete search history.

(56) References Cited

U.S. PATENT DOCUMENTS

| | | | |
|---|---|---|---|
| 5,602,594 A * | 2/1997 | Cho ..................... | H04N 19/142 375/240.05 |
| 2005/0259613 A1* | 11/2005 | Garudadri ............. | H04L 69/321 370/328 |

(Continued)

OTHER PUBLICATIONS

International Search Report (PCT/ISA/210) issued in PCT/JP2018/034942, dated Dec. 19, 2018.
(Continued)

*Primary Examiner* — Lindsay J Uhl
(74) *Attorney, Agent, or Firm* — Birch, Stewart, Kolasch & Birch, LLP.

(57) ABSTRACT

A video-images capturing device is adapted to capture video-images of a predefined path ahead or behind a moving conveyance. The moving conveyance includes an on-board transceiver wirelessly transmitting encoded video-images toward a server. A learning phase includes: analysing encoded video-images captured during the learning phase and detecting encoding data rate peaks that exceed a predefined threshold in the encoded video-images; determining positions on the predefined path to which said detected encoding data rate peaks correspond; and storing information representing the determined positions in a database. The server performs in a normal operation phase: monitoring progress of the moving conveyance on the predefined path; and notifying the video-images capturing device an upcoming encoding sequence change when the moving conveyance is about to reach a position having information thereof stored in the database, and instructing the video encoder to start a new encoding sequence when the moving conveyance reaches said position.

8 Claims, 5 Drawing Sheets

(51) Int. Cl.
H04N 19/179 (2014.01)
H04W 4/021 (2018.01)
H04W 72/08 (2009.01)

(56) References Cited

U.S. PATENT DOCUMENTS

| | | | | |
|---|---|---|---|---|
| 2005/0283809 A1* | 12/2005 | Kim | ............ | H04N 19/172 |
| | | | | 725/81 |
| 2007/0216771 A1* | 9/2007 | Kumar | ............ | B61L 23/047 |
| | | | | 348/148 |
| 2008/0025392 A1* | 1/2008 | Lee | ............ | H04N 19/142 |
| | | | | 375/240.03 |
| 2012/0050457 A1* | 3/2012 | Gu | ............ | H04N 19/164 |
| | | | | 348/14.13 |
| 2015/0163817 A1* | 6/2015 | Brunel | ............ | H04W 24/08 |
| | | | | 370/329 |
| 2016/0353401 A1* | 12/2016 | Tapia | ............ | H04W 24/02 |
| 2017/0237525 A1* | 8/2017 | Shen | ............ | G06F 11/10 |
| | | | | 714/776 |
| 2018/0342091 A1* | 11/2018 | Seibert | ............ | H04N 7/157 |

OTHER PUBLICATIONS

Written Opinion of the International Searching Authority (PCT/ISA/237) issued in PCT/JP2018/034942, dated Dec. 19, 2018.

* cited by examiner

METHOD AND SERVER FOR CONTROLLING VIDEO ENCODER

TECHNICAL FIELD

The present invention generally relates to a method for controlling a video encoder of a video-images capturing device installed on a moving conveyance travelling on a predefined path, such as railroads, wherein the video-images capturing device captures video-images of the predefined path ahead or behind the moving conveyance while the moving conveyance is moving on the predefined path.

BACKGROUND ART

Moving conveyances, such as trains, can travel on predefined paths, such as railroads, without being driven by a human operator. Such moving conveyances are automatically controlled using a remote decision-making unit, such as a server, with which the moving conveyances are wirelessly communicating. Video cameras can be installed on the moving conveyance so as to enable capturing video images of the predefined path while the moving conveyance is moving on the predefined path. Such video cameras may be installed on the front of the moving conveyance so as to capture video images of what happens ahead the moving conveyance on the predefined path. Such video cameras may be installed on the rear of the moving conveyance so as to capture video images of what happens behind the moving conveyance on the predefined path.

Such captured video images are then wirelessly transmitted to the server so as to enable a human operator to monitor what happens ahead and/or behind the moving conveyance, and/or so as to keep record of what happens ahead and/or behind the moving conveyance.

It is known in the art that a main difficulty in video images encoding is to determine at which instant a new video images encoding sequence shall be started with a new I-frame (intra-frame) in which compression only relies on spatial redundancy and not on temporal redundancy. In comparison, P-frames (predicted frames) and B-frames (bi-directional predicted frames) use compression relying on temporal redundancy and generally on spatial redundancy. In other words, I-frames (also referred to as key frames) encoding is performed relatively to information that is contained only within the current frame, and not relatively to any other frame. A new video images encoding sequence is thus preferably started with an I-frame when there is no, or low, similarities with the previous frame. Although I-frames typically imply higher data rate than P-frames and B-frames since I-frames do not rely on temporal redundancy, using P-frames instead of I-frames when there is no, or low, similarities with the previous frame implies even higher data rate.

Consequently, considering the video cameras on-board the moving conveyances, inappropriately defining at which instant starting a new encoding sequence with an I-frame (or key frame) would imply extra data rate that might be incompatible with capabilities of the uplink wireless transmissions toward the server. This would generate extra-latency which would be damageable to real-time user experience at the server and which would require extra-buffering capabilities on-board the moving conveyances to compensate for limited uplink wireless resources in view of the extra-data rate needed (by considering that the uplink wireless resources would allow later on to smoothly empty the extra-buffering). An approach to manage encoding data rate and more particularly to define where to start a new encoding sequence with an I-frame (or key frame) is to store on-board a predefined quantity of raw images, make a first pass to analyse said raw images to detect scene changes and make a second pass to perform encoding by defining a new encoding sequence (I-frame) at each raw image where a scene change has been detected. This however requires a lot of on-board buffering and such processing implies a significant amount of extra-latency.

It is thus desirable to overcome the aforementioned drawbacks of the prior art. It is more particularly desirable to provide a solution that ensures adequacy of uplink transmission resources and encoding data rate due to scene changes in video images captured by a video camera on-board a moving conveyance travelling on a predefined path, wherein the video camera captures video images of the predefined path while the moving conveyance is moving on the predefined path. It is more particularly desirable to provide a solution that is simple and cost-effective.

SUMMARY OF INVENTION

To that end, the present invention concerns a method for controlling a video encoder of a video-images capturing device installed on a moving conveyance travelling on a predefined path, the video-images capturing device being adapted to capture video-images of the predefined path ahead or behind the moving conveyance, the moving conveyance including an on-board wireless radio unit wirelessly transmitting encoded video-images toward a server. The method is such that a learning phase includes: analysing encoded video-images of the predefined path resulting from an encoding of video-images captured during the learning phase and detecting encoding data rate peaks that exceed a predefined threshold in the encoded video-images; determining positions on the predefined path to which said detected encoding data rate peaks correspond; and storing information representing the determined positions in a database. Furthermore, the server performs in a normal operation phase: monitoring progress of the moving conveyance on the predefined path; and notifying the video-images capturing device an upcoming encoding sequence change when the moving conveyance is about to reach a position having information thereof stored in the database, and instructing the video encoder to start a new encoding sequence when the moving conveyance reaches said position. Thus, adequacy of uplink transmission resources and encoding data rate due to scene changes in video images captured by the video capturing-device on-board the moving conveyance travelling on the predefined path is ensured.

According to a particular embodiment, the learning phase further includes gathering radio interference observations incurred along the predefined path, and, in the normal operation phase, the server checks whether or not an amount of uplink transmission resources allocated to the on-board wireless radio unit for wirelessly transmitting the encoded video-images toward the server is sufficiently high to support an encoding data rate implied by the upcoming encoding sequence change in view of the gathered radio interference observations, and allocating extra uplink transmission resources when said amount of uplink transmission resources is not sufficient. Thus, adequacy of uplink transmission resources and encoding data rate is further improved.

According to a particular embodiment, when allocating extra uplink transmission resources is unsuccessful, the server further instructs the video encoder to decrease, in a time period prior to reaching the position at which the upcoming encoding sequence change shall occur, an encoding data rate used to generate the encoded video-images. Thus, extra uplink transmission resources for the upcoming encoding sequence change are provided by the decrease of encoding data rate prior to the upcoming encoding sequence change.

According to a particular embodiment, the video-images capturing device determines from which position of the moving conveyance the decrease of the encoding data rate shall start, in view of the actual speed of the moving conveyance. Thus, extra uplink transmission resources for the upcoming encoding sequence change can be provided at appropriate time in view of the actual speed of the moving conveyance.

According to a particular embodiment, the video encoder generates a key frame starting the new encoding sequence in a downgraded version, and smoothly decreases the encoding data rate until reaching a default encoding data rate over following predicted frames. Thus, adequacy of uplink transmission resources and encoding data rate is further improved.

The present invention also concerns a server for controlling a video encoder of a video-images capturing device installed on a moving conveyance travelling on a predefined path, the video-images capturing device being adapted to capture video-images of the predefined path ahead or behind the moving conveyance, the moving conveyance including an on-board wireless radio unit wirelessly transmitting encoded video-images toward a server implementing a learning phase by including: means for analysing encoded video-images of the predefined path resulting from an encoding of video-images captured during the learning phase and detecting encoding data rate peaks that exceed a predefined threshold in the encoded video-images; means for determining positions on the predefined path to which said detected encoding data rate peaks correspond; and means for storing information representing the determined positions in a database. Moreover, the server further includes in a normal operation phase: means for monitoring progress of the moving conveyance on the predefined path; and means for notifying the video-images capturing device an upcoming encoding sequence change when the moving conveyance is about to reach a position having information thereof stored in the database, and instructing the video encoder to start a new encoding sequence when the moving conveyance reaches said position.

The present invention also concerns a computer program that can be downloaded from a communication network and/or stored on a non-transitory information storage medium that can be read by a processing device such as a microprocessor. This computer program comprises instructions for causing implementation of the aforementioned method, when said program is run by the processing device. The present invention also concerns a non-transitory information storage medium, storing such a computer program.

The characteristics of the invention will emerge more clearly from a reading of the following description of at least one example of embodiment, said description being produced with reference to the accompanying drawings.

DESCRIPTION OF EMBODIMENTS

Figure 1:
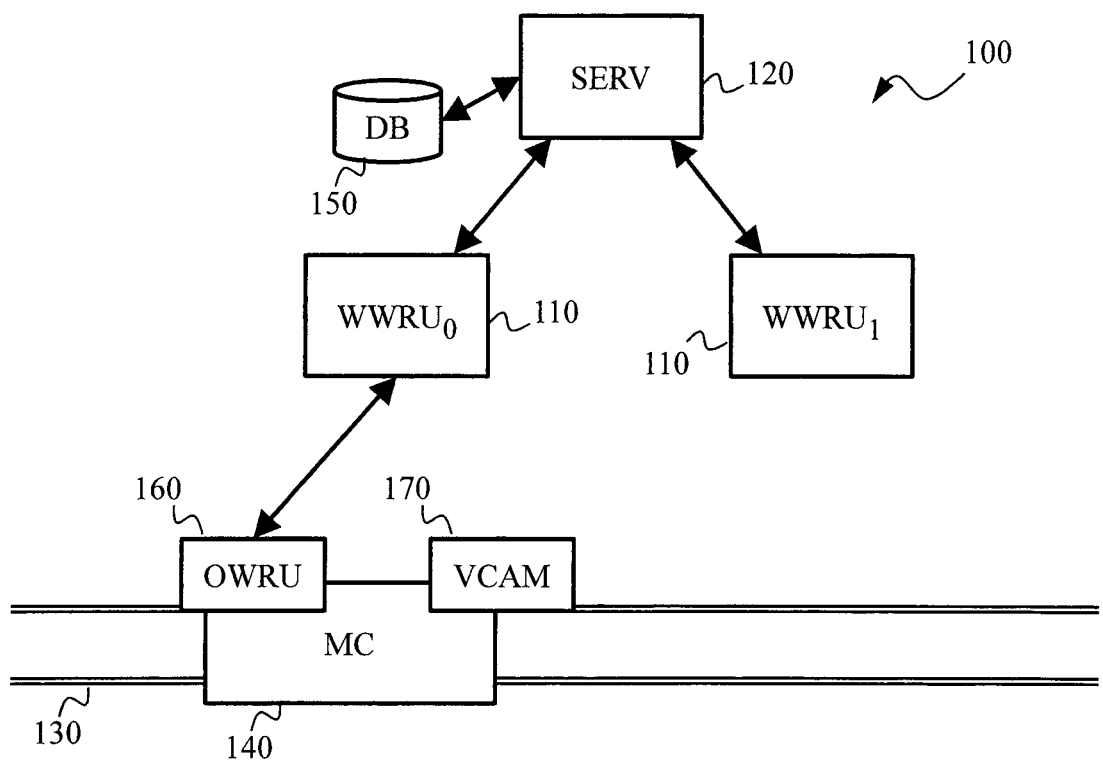
FIG. 1 schematically represents a video system in which the present invention may be implemented.

FIG. 1 schematically represents a video system 100 in which a server SERV 120 is connected to a plurality of wayside wireless radio units $WWRU_0$, $WWRU_1$ 110 located along a predefined path 130 on which moving conveyances are travelling.

The wayside wireless radio units $WWRU_0$, $WWRU_1$ 110 act as relays between the server SERV 120 and an on-board wireless radio unit OWRU 160 located in a moving conveyance MC 140. The on-board wireless radio unit OWRU 160 controls operation of the moving conveyance MC 140 according to instructions provided by the server SERV 120. The on-board wireless radio unit OWRU 160 is in charge of gathering data, more particularly position and speed of the moving conveyance MC 140 and of encoded video images of the predefined path ahead the moving conveyance MC 140. The on-board wireless radio unit OWRU 160 is further in charge of wirelessly transmitting the gathered data toward the server SERV 120.

For example, the wayside wireless radio units $WWRU_0$, $WWRU_1$ 110 are access points of a telecommunication system, such as an LTE ("Long Term Evolution") telecommunication system or the like. For example, the server SERV 120 is connected to the wayside wireless radio units $WWRU_0$, $WWRU_1$ 110 using copper wires or optical links. The moving conveyance MC 140 is for example a train and the predefined path 130 is a railroad.

It has to be noted that equivalently the on-board wireless radio unit OWRU 160 can communicate directly with the server SERV 120 using an appropriate wireless communication technology ensuring that the on-board wireless radio unit OWRU 160 remains, in view of the predefined path 130 and geographical location of the server SERV 120, within the radio coverage of the server SERV 120 and vice versa.

Automatic remote control of moving conveyances are widely addressed in the prior art and are not detailed herein since this is not an aspect related to the problem solved by the present invention.

The on-board wireless radio unit OWRU 160 gathers the video images from a video-capturing device VCAM 170, such as a camcorder, installed at the front of the moving conveyance MC 140 (capturing video images of the predefined path ahead the moving conveyance MC 140) or at the rear of the moving conveyance MC 140 (capturing video images of the predefined path behind the moving conveyance MC 140). The on-board wireless radio unit OWRU 160 may gather video images from a first video-capturing device installed at the front of the moving conveyance MC 140 and from a second video-capturing device installed at the rear of the moving conveyance MC 140. Let's illustratively consider hereafter that the moving conveyance MC 140 is equipped with a single video-capturing device installed at the front of the moving conveyance MC 140. The on-board wireless radio unit OWRU 160 may be connected to the video-capturing device VCAM 170 using a wired, wireless or optical link, or may be included in the video-capturing device VCAM 170.

The video system 100 further includes a database DB 150 used to store a description of the predefined path 130. The database DB 150 is used by the server SERV 120 to determine at which speed the moving conveyance MC 140 is able to move on the predefined path 130 according to a position of said moving conveyance MC 140 on said predefined path 130. As detailed hereafter, the database DB 150 further stores information used to provide instructions to the video-capturing device VCAM 170 via the on-board wireless radio unit OWRU 160. As also detailed hereafter, the database DB 150 may further store information used to anticipate changes in wireless uplink transmission conditions. The database DB 150 may be connected to the server SERV 120, using a wired, wireless or optical link, or may be included in the server SERV 120.

The video-capturing device VCAM 170 comprises a video encoder in charge of compressing video images captured by the video-capturing device VCAM 170. The video encoder generates encoding sequences starting with an I-frame followed by P-frames and potentially B-frames. Start of at least some encoding sequences is defined according to instructions provided by the server SERV 120. To do so, information is stored in the database DB 150 following a learning phase, as described hereafter.

Uplink transmission resources are allocated by the server SERV 120 to allow performing wireless uplink transmissions from the on-board wireless radio unit OWRU 160 toward the server SERV 120 so as to enable the on-board wireless radio unit OWRU 160 to transfer the encoded video images provided by the video-capturing device VCAM 170. Other uplink transmission resources are used for other communications (e.g. with other moving conveyances or shared with other communication systems).

Figure 2:
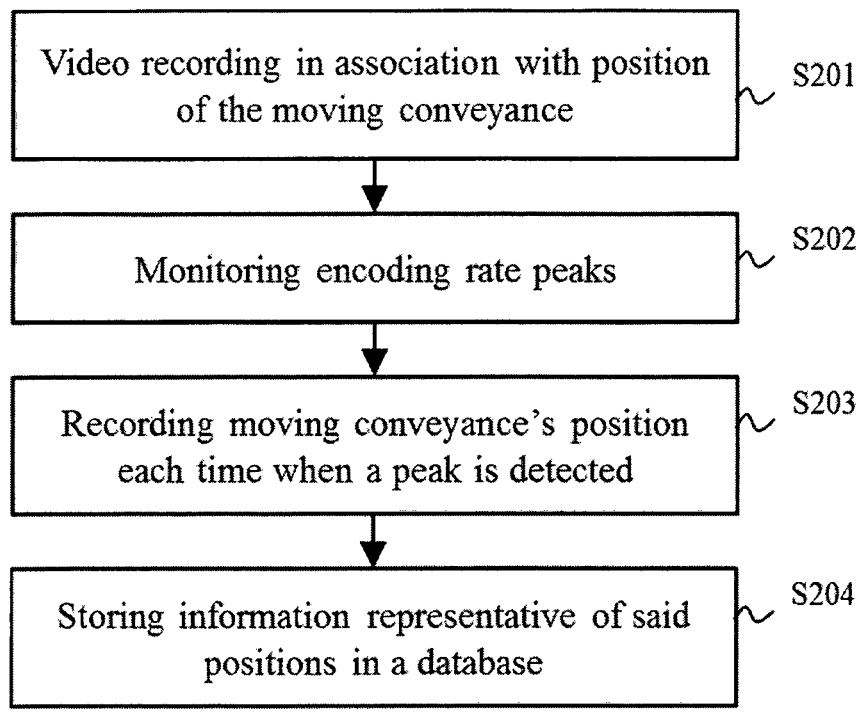
FIG. 2 schematically represents a first algorithm for performing a learning phase.

FIG. 2 schematically represents a first algorithm for performing the aforementioned learning phase. The learning phase is performed by gathering data during preceding journeys of the moving conveyance MC 140, or of other similarly equipped moving conveyances, on the predefined path 130. Let's illustratively consider that the learning phase is performed by gathering data during at least one preceding journey of the moving conveyance MC 140 on the predefined path 130.

In a step S201, the video-capturing device VCAM 170 starts video recording. The moving conveyance MC 140 starts travelling on the predefined path 130 and the video-capturing device VCAM 170 continues video recording. The encoder of the video-capturing device VCAM 170 performs video images compression by relying on temporal redundancy.

The video-capturing device VCAM 170 may record the encoded video images into a local database, for further later analysis by the server SERV 120, or wirelessly transmit the encoded video images to the server SERV 120 via the on-board wireless radio unit OWRU 160. In this case, data storage portable means, such as a USB (Universal Serial Bus) flash drive, is firstly plugged to the video-capturing device VCAM 170 for transferring to the USB flash drive the encoded video images, in association with position information of the moving conveyance MC 140 (see hereafter), at the end of the journey of the moving conveyance MC 140 on the predefined path 130. The USB flash drive is secondly plugged to the server SERV 120 for transferring thereto the data stored by the USB flash drive.

In another approach, the video-capturing device VCAM 170 wirelessly transmits the encoded video images, in association with position information of the moving conveyance MC 140 (see hereafter), to the server SERV 120 via the on-board wireless radio unit OWRU 160. It is in this case considered that the uplink transmission resources are sufficient to perform such a transfer during the learning phase, since the learning phase does not correspond to normal operation of the moving conveyance MC 140 and that the on-board wireless radio unit OWRU 160 does not have to share said uplink transmission resources with others during the learning phase or that transfer latency is not critical during the learning phase.

In yet another approach, the analysis (described hereafter) of the encoded video images is performed on-board the moving conveyance MC 140, by a dedicated processing device or by the video-capturing device VCAM 170. In this case, data storage portable means, such as a USB flash drive, is firstly plugged to the video-capturing device VCAM 170 for transferring to the USB flash drive the result of the analysis performed by the video-capturing device VCAM 170. The USB flash drive is secondly plugged to the server SERV 120 for transferring thereto the data stored by the USB flash drive. In a variant, the result of the analysis performed by the video-capturing device VCAM 170 is wirelessly transferred to the server SERV 120 via the on-board wireless radio unit OWRU 160.

Actual position of the moving conveyance MC 140 on the predefined path 130 is recorded at the same time as the video-images are captured by the video-capturing device VCAM 170. Each encoded video image is thus associated with a corresponding recorded position of the moving conveyance MC 140 on the predefined path 130. The actual position of the moving conveyance MC 140 is obtained using a GPS (Global Positioning System) device installed on the moving conveyance MC 140. In a variant, the actual position of the moving conveyance MC 140 is obtained using a beacon detector adapted for detecting beacons placed on or along the predefined path 130. In this case, the actual position of the moving conveyance MC 140 is computed by extrapolation according to the position of the last detected beacon, an instant at which said beacon has been detected, the actual instant at which the actual position of the moving conveyance MC 140 has to be determined and the speed of the moving conveyance MC 140. The speed of the moving conveyance MC 140 can be determined using a tachymeter connected to the video-capturing device VCAM 170.

In a step S202, the video system 100 performs analysis of the encoded video images obtained in the step S201. The analysis consists in detecting encoding rate peaks in the encoded video images obtained in the step S201. A peak is detected when the encoding rate exceeds a predefined threshold TH, which means that a change of scene occurs in the video. Such a change of scene occurs when the moving conveyance MC 140 enters or exits a tunnel for instance. As mentioned above, the analysis can be performed on-board the moving conveyance MC 140 or at the server SERV 120.

In a step S203, the video system 100 keeps track of what was the position of the moving conveyance MC 140 corresponding to each encoding rate peak detected in the step S202. After having analysed the whole video of the travel of the moving conveyance MC 140 on the predefined path 130, the video system 100 has a collection of positions on the predefined path 130 corresponding to changes of scene in the recorded video.

In a step S204, the server SERV 120 stores in the database DB 150 the collection of positions on the predefined path 130 corresponding to the changes of scene detected in the recorded video during the learning phase. This collection of positions is then used for future journeys of the moving conveyance MC 140, or of other moving conveyances similarly equipped, on the predefined path, in order to control the video encoder embedded in the moving conveyance in question, as described hereafter with respect to FIGS. 4 and 5.

Figure 3:
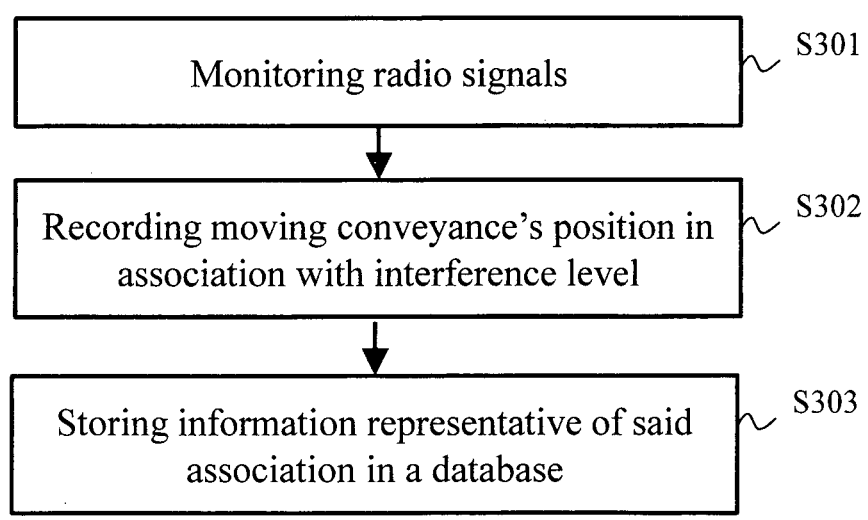
FIG. 3 schematically represents a second algorithm for performing the learning phase.

FIG. 3 schematically represents a second algorithm for performing the learning phase. The algorithm of FIG. 3 aims at optionally complementing the learning phase described hereinbefore with respect to FIG. 2 with interference-related data. Such interference-related data are useful for uplink transmissions conditions anticipation on the predefined path 130. As already mentioned, the learning phase is performed by gathering data during preceding journeys of the moving conveyance MC 140, or of other similarly equipped moving conveyances, on the predefined path 130. It is illustratively considered that the learning phase is performed by gathering data during at least one preceding journey of the moving conveyance MC 140 on the predefined path 130.

In a step S301, the on-board wireless radio unit OWRU 160 monitors radio signals during the at least one journey on the predefined path 130. In other words, the on-board wireless radio unit OWRU 160 makes observations of interference incurred when the moving conveyance MC 140 travels on the predefined path 130. Said observations are representative of interference induced by wayside interferers present along said predefined path 130. In the scope of interference learning, the predefined path 130 may be divided into successive clusters (or segments) and each cluster boundary can be identified by a dedicated beacon. Consequently, the observed interference can be averaged per cluster.

In a step S302, the on-board wireless radio unit OWRU 160 records actual position of the moving conveyance in association with the interference observed in the step S301. Actual position of the moving conveyance MC 140 on the predefined path 130 is therefore recorded at the same time as the interference is observed by the on-board wireless radio unit OWRU 160. Each interference observation is thus associated with a corresponding recorded position of the moving conveyance MC 140 on the predefined path 130. The actual position of the moving conveyance MC 140 is obtained using a GPS (Global Positioning System) device installed on the moving conveyance MC 140. In a variant, the actual position of the moving conveyance MC 140 is obtained using a beacon detector adapted for detecting beacons placed on or along the predefined path 130. In this case, the actual position of the moving conveyance MC 140 is computed by extrapolation according to the position of the last detected beacon, an instant at which said beacon has been detected, the actual instant at which the actual position of the moving conveyance MC 140 has to be determined and the speed of the moving conveyance MC 140. The speed of the moving conveyance MC 140 can be determined using a tachymeter connected to the on-board wireless radio unit OWRU 160. Clusters definition can be used instead of performing extrapolation, as mentioned above.

In a step S303, the server SERV 120 stores in the database DB 150 the association of the observed interference with the corresponding position on the predefined path 130 at which said interference has been observed. The transfer of information representative of the association of the observed interference with the corresponding position on the predefined path 130 from the on-board wireless radio unit OWRU 160 to the server SERV 120 can be done by using data storage portable means, such as a USB flash drive, as already described with respect to FIG. 3, or can be done by wireless transmission to the server SERV 120.

The algorithm of FIG. 3 can be repeated for plural journeys on the predefined path 130. For instance, interference data can be collected on different time periods of a day and/or on different time periods of a week and/or on different time periods of a month and/or on different time periods of a year. Indeed, wayside interferers behaviour may differ as a function of a considered calendar time slot, and thus it might be useful to gather, in a complementary manner, interference observations at different instants in time. Interference observations obtained over plural journeys on the predefined path 130 may also be merged by averaging the various interference observations performed at each position, or at each cluster, on the predefined path 130.

Figure 4:
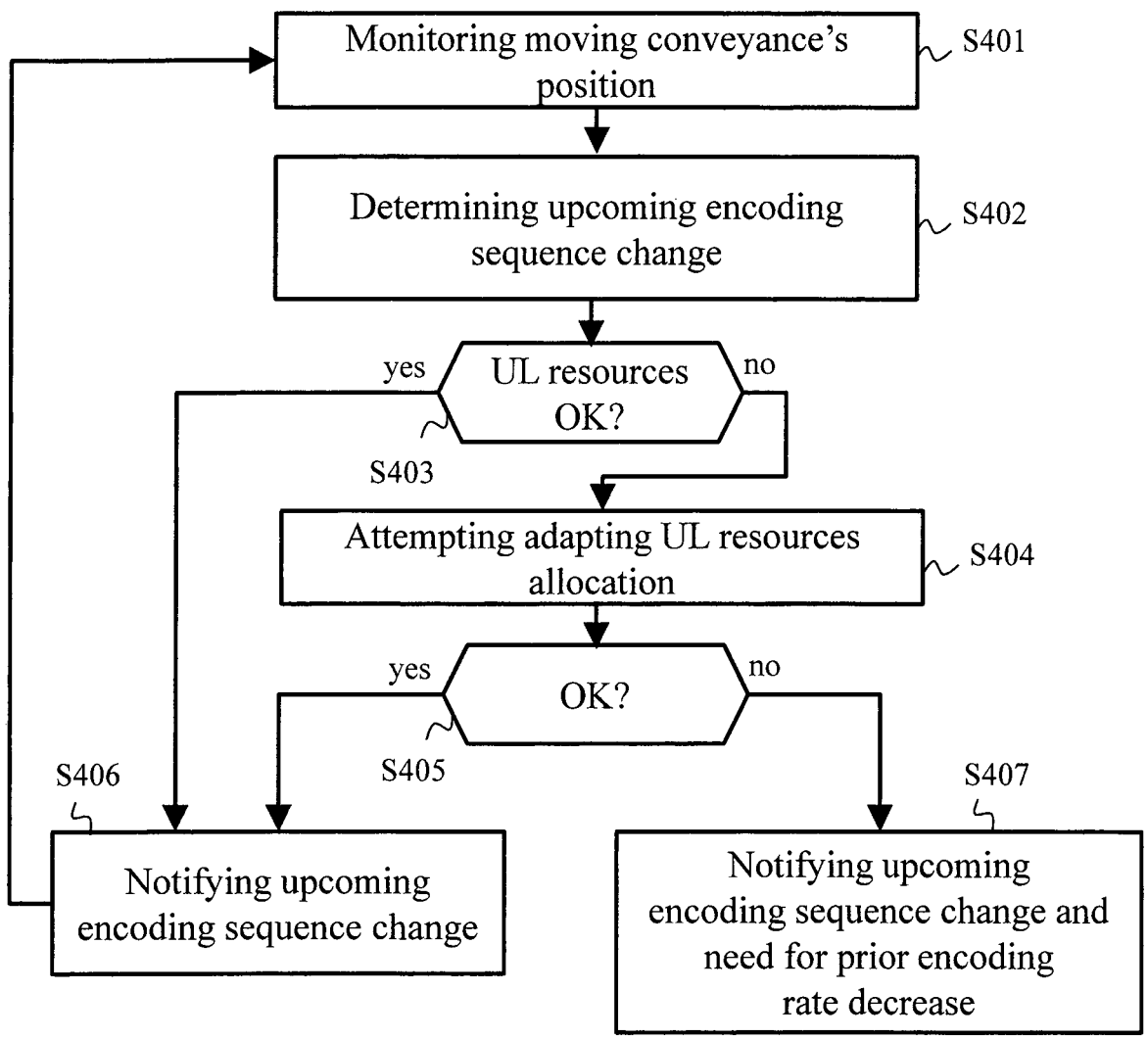
FIG. 4 schematically represents an algorithm for providing instructions to a video encoder of the video system.

FIG. 4 schematically represents an algorithm for providing instructions to the video encoder of the video-capturing device VCAM 170. The algorithm of FIG. 4 is implemented by the server SERV 120. It is considered when starting execution of the algorithm of FIG. 4 that the learning phase described hereinbefore with respect to FIG. 2 has been completed and that the database DB 150 has been populated accordingly. It is optionally considered when starting execution of the algorithm of FIG. 4 that the learning phase complement described hereinbefore with respect to FIG. 3 has been also completed and that the database DB 150 has been also populated accordingly. The algorithm of FIG. 4 is launched when the moving conveyance MC 140 starts travelling on the predefined path during a normal operation phase.

In a step S401, the server SERV 120 monitors over time the position of the moving conveyance MC 140 on the predefined path 130. The server SERV 120 may be aware of progress of the moving conveyance MC 140 on the predefined path 130 thanks to position information wirelessly transmitted by the on-board wireless radio unit OWRU 160 to the server SERV 120. The on-board wireless radio unit OWRU 160 is aware of the actual position of the moving conveyance MC 140 as already described hereinbefore with respect to FIG. 4. In a variant, the server SERV 120 can estimate progress of the moving conveyance MC 140 on the predefined path 130 thanks to a triangulation process based on radio signals received by the wayside wireless radio units $WWRU_0$, $WWRU_1$ 110 placed along the predefined path 130.

In a step S402, the server SERV 120 determines an upcoming encoding sequence change in view of the position of the moving conveyance on the predefined path 130. To do so, the server SERV 120 retrieves from the database DB 150 the collection of positions on the predefined path 130 corresponding to the changes of scene detected in the recorded video during the learning phase. The server SERV 120 searches in said collection of positions what is the next position on the predefined path 130 on which a change of scene is foreseen, from the knowledge acquired during the learning phase and from the position of the moving conveyance on the predefined path 130 obtained in the step S401.

In a step S403, the server SERV 120 checks whether or not the amount of uplink transmission resources allocated to the on-board wireless radio unit OWRU 160 is sufficiently high to support the encoding data rate implied by the upcoming encoding sequence change. Variability of the amount of uplink transmission resources that can be effectively used by the on-board wireless radio unit OWRU 160 for wirelessly transferring the video-images depends on variations in uplink transmission channel conditions. Effective available throughput can be estimated using the interference knowledge optionally stored in the database DB 150 during the learning phase. The server SERV 120 is then able to determine whether interference level, at the position on the predefined path 130 at which the upcoming encoding sequence change is expected, would avoid absorbing the encoding data rate increase implied by the upcoming encoding sequence change (new I-frame).

When the amount of uplink transmission resources allocated to the on-board wireless radio unit OWRU 160 is sufficiently high to support the encoding data rate implied by the upcoming encoding sequence change, a step S406 is performed; otherwise, a step S404 is performed.

In the step S404, the server SERV 120 attempts adapting the uplink transmission resources allocation that allows the on-board wireless radio unit OWRU 160 to wirelessly transmit the video-images toward the server SERV 120, so as to enable absorbing the encoding data rate increase implied by the upcoming encoding sequence change that is about to be requested (see step S406 or S407 described hereafter) by the server SERV 120. The uplink transmission resources may be shared with other communications and no more uplink transmission resources might be available to compensate the interference level foreseen at the position on the predefined path 130 at which the upcoming encoding sequence change is expected.

In the step S405, the server SERV 120 checks whether or not the attempt of adapting the uplink transmission resources allocation performed in the step S404 is successful. For instance, a backup pool of uplink transmission resources may be empty and the server SERV 120 may not have found a solution to release uplink transmission resources from other communications, which led to a situation in which the server SERV 120 may not have been able to obtain extra resources for the uplink transmissions from the on-board wireless radio unit OWRU 160. When the attempt of adapting the uplink transmission resources allocation performed in the step S404 is successful, the step S406 is performed; otherwise, the step S407 is performed.

In the step S406, the server SERV 120 notifies upcoming encoding sequence change to the video-capturing device VCAM 170. The server SERV 120 transmits to the video-capturing device VCAM 170, via the on-board wireless radio unit OWRU 160, information representative of said position on the predefined path 130 at which a change of scene is expected in view of the data gathered during the learning phase. As described hereafter with respect to FIG. 5, the step S406 allows the video-capturing device VCAM 170 to define when starting a new encoding sequence with an I-frame (or key frame). The step S401 is then repeated. In the case where extra uplink transmission resources have been temporarily allocated by the server SERV 120 to the on-board wireless radio unit OWRU 160, the server SERV 120 transmits to the on-board wireless radio unit OWRU 160 information representative of said temporarily allocated extra uplink transmission resources.

In the step S407, the server SERV 120 notifies upcoming encoding sequence change to the video-capturing device VCAM 170, as done in the step S406. The server SERV 120 further notifies in the step S407 that there is a need for prior encoding data rate decrease, so as to overcome lack of extra uplink transmission resources that would be implied by said upcoming encoding sequence change. As described hereafter with respect to FIG. 5, the step S407 allows the video-capturing device VCAM 170 to define when starting a new encoding sequence with an I-frame (or key frame) and allows the video-capturing device VCAM 170 to define a prior time period in which the encoding data rate is temporarily decreased. Decreasing the encoding data rate during this prior time period would allow compensating extra encoding data rate implied by the I-frame (or key frame) generation instructed by the server SERV 120. The server SERV 120 may indicate in which magnitude the encoding data rate shall be applied (see hereafter with respect to FIG. 5) so as to match the throughput resulting from the radio conditions foreseen in view of the interference data collected during the learning phase complement. The step S401 is then repeated.

The algorithm of FIG. 4 thus loops as far as the moving conveyance MC 140 is travelling on the predefined path 130. When the moving conveyance MC 140 ends its journey on the predefined path 130, the algorithm of FIG. 4 is stopped.

Figure 5:
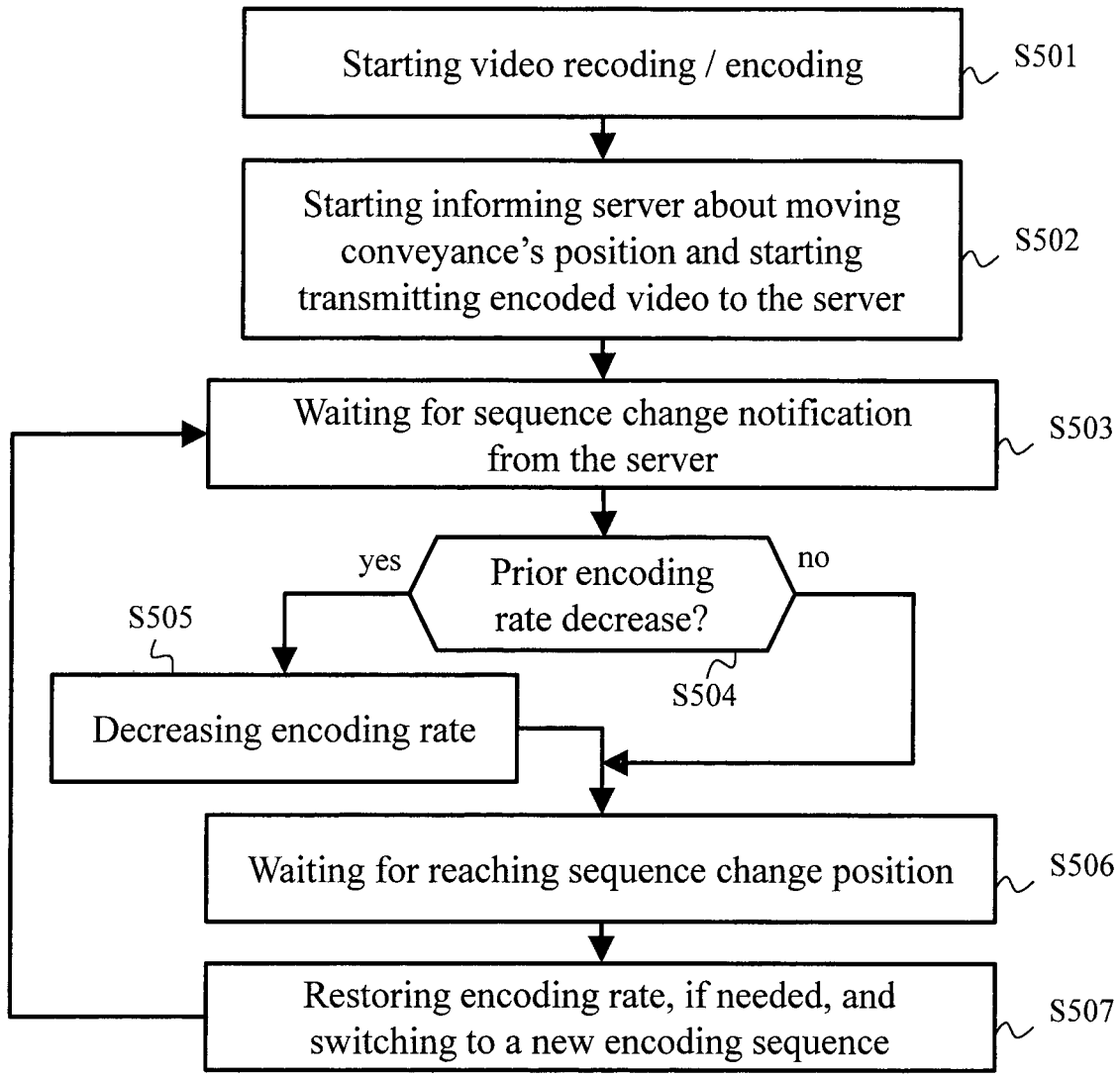
FIG. 5 schematically represents an algorithm for encoding video images according to the provided instructions.

FIG. 5 schematically represents an algorithm for encoding video images, in particular according to the instructions provided by the server SERV 120 in the step S406 or S407. As for the algorithm of FIG. 4, the algorithm of FIG. 5 is executed when the moving conveyance MC 140 travels on the predefined path 130 during the normal operation phase.

In a step S501, the video-capturing device VCAM 170 starts video recording and encoding. The video-capturing device VCAM 170 uses a predefined encoding data rate, except when differently instructed by the server SERV 120, as described hereafter. The video-capturing device VCAM 170 captures video-images of the predefined path 130 ahead or behind the moving conveyance MC 140, and encodes the captured video-images using the video encoder. The video encoder generates I-frames (or key frames) and P-frames (predicted frames), and potentially B-frames (bidirectional predicted frames), according to a default encoding configuration. The video encoder however further generates new I-frames (i.e. starts new encoding sequences) upon request by the server SERV 120, as described hereafter. Uplink transmission resources are allocated to the on-board wireless radio unit OWRU 160 to allow the video-capturing device VCAM 170 to transmit the encoded video-images toward the server SERV 120. The uplink transmission resources allocation takes into account said default encoding configuration so that the video-capturing device VCAM 170 can transfer the encoded video-images despite variability of the uplink radio conditions. As described hereinbefore with respect to FIG. 4, the uplink transmission resources allocation may however be adapted when the server SERV 120 specifically requests that a new encoding sequence be started by an I-frame (or key frame).

In a step S502, the video-capturing device VCAM 170 starts transmitting the encoded video-images toward the server SERV 120, via the on-board wireless radio unit OWRU 160, using the uplink transmission resources allocated thereto. Preferably, the on-board wireless radio unit OWRU 160 starts informing the server SERV 120 about the actual position of the moving conveyance MC 140 on the predefined path 130 so that the server SERV 120 can monitor progress of the moving conveyance MC 140 on the predefined path 130. As described hereinbefore, the server SERV 120 can also determine monitor progress of the moving conveyance MC 140 on the predefined path 130 without being informed thereof by the on-board wireless radio unit OWRU 160.

In a step S503, the video-capturing device VCAM 170 waits for encoding sequence change notification from the server SERV 120. Once received, the video-capturing device VCAM 170 checks in a step S504 whether or not the notification indicates a need for prior encoding data rate decrease. When the video-capturing device VCAM 170 is instructed by the server SERV 120 (see step S406) not to decrease the encoding data rate prior to switching to a new encoding sequence (I-frame generation), a step S506 is performed; otherwise, when the video-capturing device VCAM 170 is instructed by the server SERV 120 (see step S407) to decrease the encoding data rate prior to switching to a new encoding sequence (I-frame generation), a step S505 is performed.

In the step S505, the video-capturing device VCAM 170 decreases the encoding data rate prior to switching to a new encoding sequence (I-frame generation). The video-capturing device VCAM 170 may decrease the encoding data rate a predefined amount of time prior to reaching the position POS on the predefined path 130 at which the change of encoding sequence has to be performed. The video-capturing device VCAM 170 determines from which position of the moving conveyance MC 140 the decrease of the encoding data rate shall start, in view of the actual speed of the moving conveyance MC 140. The amount of time prior to reaching the position POS during which the encoding data rate shall be decreased may in a variant be specified by the server SERV 120 in its instructions. The video-capturing device VCAM 170 may decrease the encoding data rate by a predefined percentage or by a percentage indicated by the server SERV 120 in its instructions. Then the step S506 is performed.

In the step S506, the video-capturing device VCAM 170 waits that the moving conveyance MC 140 reaches the position POS on the predefined path 130 at which the change of encoding sequence has to be performed. Once the position POS is reached, in a step S507, the video-capturing device VCAM 170 generates a new encoding sequence, i.e. generates an I-frame (or key frame). In the case where the step S505 has been performed beforehand, the video-capturing device VCAM 170 restores the default encoding data rate when starting the new encoding sequence.

In a particular embodiment, the video-capturing device VCAM 170 increases the encoding data rate for starting the new encoding sequence, although it may only generate a downgraded version of the I-frame (or key frame) starting the new encoding sequence, and smoothly decreases the encoding data rate until reaching the default encoding data rate over following P-frames (predicted frames). Thus, extra encoding data rate implied by the I-frame generation is smoothly absorbed and any encoding data rate deficiency implied by the downgraded version of the I-frame (or key frame) is compensated over the following P-frames (predicted frames).

Figure 6A:
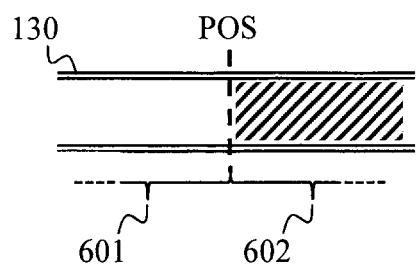
FIG. 6A schematically represents changes of encoding sequence resulting from execution of the algorithms of FIGS. 4 and 5.
Figure 6B:
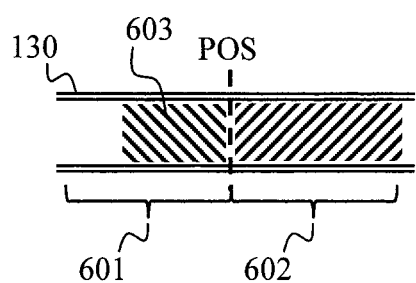
FIG. 6B schematically represents changes of encoding sequence resulting from execution of the algorithms of FIGS. 4 and 5.

The result of the step S506 without having performed beforehand the step S505 is schematically illustrated in FIG. 6A. Before the aforementioned position POS, an encoding sequence 601 is on the way. When the position POS is reached by the moving conveyance MC 140, a switch to a new encoding sequence 602 is performed. The result of the step S506 after having performed beforehand the step S505 is schematically illustrated in FIG. 6B. Here again, when the position POS is reached by the moving conveyance MC 140, a switch to a new encoding sequence 602 is performed. However, in a time period 603 preceding the arrival of the moving conveyance MC 140 to the position POS, the encoding rate of the encoding sequence 601 is decreased compared with the default encoding rate usually applied by the video encoder of the video-capturing device VCAM 170.

It can be noted that decreasing the encoding data rate prior to generating the I-frame (or key frame) further allows compensating a short lack of reaction of the switching to a new encoding sequence in view of the effective change of scene in the captured video. Indeed, in the case where the change of scene in the captured video appears prior to the effective switch to a new encoding sequence (due to e.g. inaccuracy of the moving conveyance position determination), the change of scene will be downgraded by the applied encoding data rate decrease, and video-image quality is then be quickly restored when the switch to the new encoding sequence becomes effective. Then the step S503 is repeated.

The algorithm of FIG. 5 thus loops as far as the moving conveyance MC 140 is travelling on the predefined path 130. When the moving conveyance MC 140 ends its journey on the predefined path 130, the algorithm of FIG. 5 is stopped.

Figure 7:
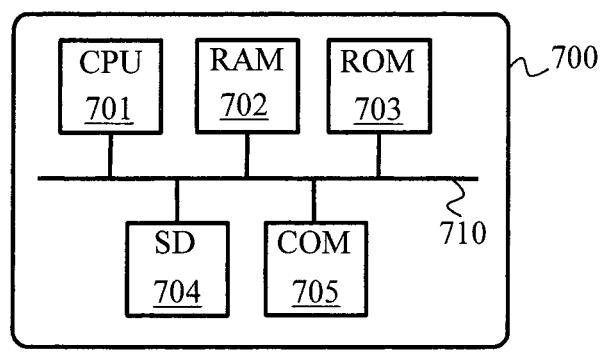
FIG. 7 schematically represents an architecture of a processing device of the video system.

FIG. 7 schematically represents an example hardware architecture of a processing device 700 of the video system. Such a processing device can be included in the on-board wireless radio unit OWRU 160 or in the video-capturing device VCAM 170 in order to implement the algorithm and steps described hereinbefore with respect to the on-board wireless radio unit OWRU 160. Such a processing device can also be included in the video-capturing device VCAM 170 in order to implement the algorithm and steps described hereinbefore with respect to the video-capturing device VCAM 170. Such a processing device can also be included in the server SERV 120 in order to implement the algorithms and steps described hereinbefore with respect to the server SERV 120. It can be noted that the wayside wireless radio units $WWRU_0$, $WWRU_1$ 110 may be built with the same hardware architecture.

According to the shown example of hardware architecture, the processing device 700 comprises at least the following components interconnected by a communications bus 710: a processor, microprocessor, microcontroller or CPU (Central Processing Unit) 701; a RAM (Random-Access Memory) 702; a ROM (Read-Only Memory) 703; an HDD (Hard-Disk Drive) or an SD (Secure Digital) card reader 704, or any other device adapted to read information stored on non-transitory information storage medium; a communication interface COM 705 or a set of communication interfaces.

When the hardware architecture concerns the server SERV 120, the communication interface COM 705 enables the server SERV 120 to communicate with the wayside wireless radio units $WWRU_0$, $WWRU_1$ 110. In a variant, the communication interface COM 705 enables the server SERV 120 to wirelessly communicate directly with the on-board wireless radio unit OWRU 160.

When the hardware architecture concerns the on-board wireless radio unit OWRU 160, the set of communication interfaces COM 705 enables the on-board wireless radio unit OWRU 160 to wirelessly communicate with the wayside wireless radio units $WWRU_0$, $WWRU_1$ 110 and to communicate with the video-capturing device VCAM 170. In a variant, the set of communication interfaces COM 705 enables to the on-board wireless radio unit OWRU 160 to wirelessly communicate directly with the server SERV 120 instead of with the wayside wireless radio units $WWRU_0$, $WWRU_1$ 110.

When the hardware architecture concerns the video-capturing device VCAM 170, the communication interface COM 705 enables the video-capturing device VCAM 170 to communicate with the on-board wireless radio unit OWRU 160.

When the hardware architecture concerns the wayside wireless radio units $WWRU_0$, $WWRU_1$ 110, the set of communication interfaces COM 705 enables the wayside wireless radio units $WWRU_0$, $WWRU_1$ 110 to communicate with the server SERV 120 on one hand and to wirelessly communicate with the on-board wireless radio unit OWRU 160 on the other hand.

CPU 701 is capable of executing instructions loaded into RAM 702 from ROM 703 or from an external memory, such as an SD card via the SD card reader 704. After the processing device 700 has been powered on, CPU 701 is capable of reading instructions from RAM 702 and executing these instructions. The instructions form one computer program that causes CPU 701 to perform some or all of the steps of the algorithms described hereinbefore.

Consequently, it is understood that any and all steps of the algorithm described herein may be implemented in software by execution of a set of instructions or program by a programmable computing machine, such as a PC (Personal Computer), a DSP (Digital Signal Processor) or a microcontroller; or else implemented in hardware by a machine or a dedicated chip or chipset, such as an FPGA (Field-Programmable Gate Array) or an ASIC (Application-Specific Integrated Circuit). In general, the server SERV 120, the on-board wireless radio unit OWRU 160 and the video-capturing device VCAM 170 comprise processing electronics circuitry configured for implementing the relevant steps as described herein with respect to the device in question.

The invention claimed is:

1. A method for controlling a video encoder of a video-images capturing device installed on a moving conveyance travelling on a predefined path, the video-images capturing device being adapted to capture video-images of the predefined path ahead or behind the moving conveyance, the moving conveyance including an on-board transceiver wirelessly transmitting encoded video-images toward a server, characterized in that a learning phase includes:
   analysing encoded video-images of the predefined path resulting from an encoding of video-images captured during the learning phase and detecting encoding data rate peaks that exceed a predefined threshold in the encoded video-images;
   determining positions on the predefined path to which said detected encoding data rate peaks correspond; and
   storing information representing the determined positions in a database;
   and in that the server performs in a normal operation phase:
   monitoring progress of the moving conveyance on the predefined path;
   ensuring an adequacy of uplink transmission resources to allow the on-board transceiver to wirelessly transmit the encoded video-images toward the server; and
   notifying, after the adequacy of the uplink transmission resources is ensured, the video-images capturing device of an upcoming encoding sequence change when the moving conveyance is about to reach a position having information thereof stored in the database, and instructing the video encoder to start a new encoding sequence when the moving conveyance reaches said position.

2. A method for controlling a video encoder of a video-images capturing device installed on a moving conveyance travelling on a predefined path, the video-images capturing device being adapted to capture video-images of the predefined path ahead or behind the moving conveyance, the moving conveyance including an on-board transceiver wirelessly transmitting encoded video-images toward a server, characterized in that a learning phase includes:
   analysing encoded video-images of the predefined path resulting from an encoding of video-images captured during the learning phase and detecting encoding data rate peaks that exceed a predefined threshold in the encoded video-images;
   determining positions on the predefined path to which said detected encoding data rate peaks correspond; and
   storing information representing the determined positions in a database;
   and in that the server performs in a normal operation phase:
   monitoring progress of the moving conveyance on the predefined path;
   notifying the video-images capturing device an upcoming encoding sequence change when the moving conveyance is about to reach a position having information thereof stored in the database, and instructing the video encoder to start a new encoding sequence when the moving conveyance reaches said position,
   wherein the learning phase further includes gathering radio interference observations incurred along the predefined path, and
   wherein, in the normal operation phase, the server checks whether or not an amount of uplink transmission resources allocated to the on-board transceiver for wirelessly transmitting the encoded video-images toward the server is sufficiently high to support an encoding data rate implied by the upcoming encoding sequence change in view of the gathered radio interference observations, and allocating extra uplink transmission resources when said amount of uplink transmission resources is not sufficient.

3. The method according to claim 2, wherein, when allocating extra uplink transmission resources is unsuccessful, the server further instructs the video encoder to decrease, in a time period prior to reaching the position at which the upcoming encoding sequence change shall occur, an encoding data rate used to generate the encoded video-images.

4. The method according to claim 3, wherein the video-images capturing device determines from which position of the moving conveyance the decrease of the encoding data rate shall start, in view of the actual speed of the moving conveyance.

5. The method according to claim 3, wherein the video encoder generates a key frame starting the new encoding sequence in a downgraded version, and smoothly decreases the encoding data rate until reaching a default encoding data rate over following predicted frames.

6. The method according to claim 4, wherein the video encoder generates a key frame starting the new encoding sequence in a downgraded version, and smoothly decreases the encoding data rate until reaching a default encoding data rate over following predicted frames.

7. A non-transitory information storage medium storing a computer program comprising program code instructions that can be loaded in a programmable device for implementing the method according to claim 1, when the program code instructions are run by the programmable device.

8. A server for controlling a video encoder of a video-images capturing device installed on a moving conveyance travelling on a predefined path, the video-images capturing device being adapted to capture video-images of the predefined path ahead or behind the moving conveyance, the moving conveyance including an on-board transceiver wirelessly transmitting encoded video-images toward a server, characterized in that the server implements a learning phase by including:
- analysing encoded video-images of the predefined path resulting from an encoding of video-images captured during the learning phase and detecting encoding data rate peaks that exceed a predefined threshold in the encoded video-images;
- determining positions on the predefined path to which said detected encoding data rate peaks correspond; and
- storing information representing the determined positions in a database;

and in that the server further includes in a normal operation phase:
- monitoring progress of the moving conveyance on the predefined path;
- ensuring an adequacy of uplink transmission resources to allow the on-board transceiver to wirelessly transmit the encoded video-images toward the server; and
- notifying, after the adequacy of the uplink transmission resources is ensured, the video-images capturing device of an upcoming encoding sequence change when the moving conveyance is about to reach a position having information thereof stored in the database, and instructing the video encoder to start a new encoding sequence when the moving conveyance reaches said position.

* * * * *